United States Patent [19]
Lee et al.

[11] Patent Number: 5,140,511
[45] Date of Patent: Aug. 18, 1992

[54] SWITCHED MODE POWER SUPPLY HAVING A DISCHARGE CIRCUIT FOR AN AUXILIARY POWER SOURCE

[75] Inventors: Intae Lee, Anyang; Myunghwan Kim, Suwon, both of Rep. of Korea

[73] Assignee: Samsung Electronics, Kyunggi, Rep. of Korea

[21] Appl. No.: 694,632

[22] Filed: May 2, 1991

[30] Foreign Application Priority Data

May 11, 1990 [KR] Rep. of Korea ............... 90-6335

[51] Int. Cl.$^5$ .................................. H02M 3/335
[52] U.S. Cl. .................................. 363/21; 363/97; 323/299; 361/91; 361/111
[58] Field of Search ............... 363/16, 18, 19, 20, 363/21, 22, 23, 24, 25, 55, 56, 95, 97; 323/299; 361/90, 91, 111

[56] References Cited

U.S. PATENT DOCUMENTS

| | | | |
|---|---|---|---|
| 4,156,273 | 5/1979 | Sato | 363/21 X |
| 4,236,187 | 11/1980 | Mochizuki et al. | 363/21 X |
| 4,459,651 | 7/1984 | Fenter | 363/21 |
| 4,956,761 | 9/1990 | Higashi | 363/21 X |

Primary Examiner—Voeltz, Emanuel T.
Attorney, Agent, or Firm—Cushman, Darby & Cushman

[57] ABSTRACT

A switched-mode power supply including a primary rectifying circuit connected to an AC power supply, a transformer connected to the primary rectifying circuit, a secondary rectifying circuit connected to the secondary side of the transformer, a voltage fluctuation detector for sensing fluctuation in the output voltage, a signal generator for generating switching signals in response to the fluctuation detector, a switching tansistor for shunting the transformer to ground in response to the switching signals, a protective circuit responsive to the output voltage for stopping any abnormal operation of the switching signal generator, and an auxiliary power circuit for supplying power to the switching signal generator and to the protective circuit. The power supply further comprises an AC power cut-off detecting circuit for detecting whether the AC power is interrupted and a discharge circuit for discharging any residual electric charge of the auxiliary power circuit according to the output of the detecting circuit.

4 Claims, 2 Drawing Sheets

SWITCHED MODE POWER SUPPLY HAVING A DISCHARGE CIRCUIT FOR AN AUXILIARY POWER SOURCE

BACKGROUND OF THE INVENTION (1) Field of the Invention

The present invention relates to a switched mode power supply (hereafter referred to as SMPS), and in particular to an SMPS having a discharge circuit for causing the output voltage of an auxiliary power source (for supplying an operating power to a switching signal generator and a protective circuit) to drop quickly on turning off the power source.

(2) Description of the Prior Art

An SMPS includes a power supplying device for rectifying the commercially supplied alternating voltage. Current in the primary winding of a switching transformer is switched on and off according to the rectified output voltage of the secondary winding of the transformer. Since such an SMPS has a low ripple content in its output, it is widely used in computer systems or a machinery where a precise power supply is necessary.

Such an SMPS has generally adopted a voltage mode type of a kind of pulse width modulation method, but recently is changing to adopt a current mode type.

The prior art SMPS of current mode type has a disadvantage that, in the case where a person turns the power source off and then on momentarily or operates in response to a disorder of various systems which are connected to the SMPS, and thus the power is turned off, it takes considerable time to re-operate the system. The prior art SMPS of a current mode type will be described below in detail, referring to FIG. 1.

As illustrated, the SMPS of a current mode type includes a primary rectifying circuit 1 having a bridge-type rectifier BD1 for full-wave rectification of alternating voltage applied through a plug PL1 and a capacitor C1 connected between the output of the rectifier BD1 and ground.

The output terminal of the primary rectifying circuit 1 is connected to a primary winding T11 of a switching transformer T1 of which a secondary winding T12 (on the load side) is connected to a secondary rectifying circuit 2 for supplying operating power to the load side and including a forward diode D1 and a capacitor C2 connected between the anode of the diode D1 and ground.

In addition, the transformer T1 further comprises an auxiliary secondary winding T13 which is connected to an auxiliary power source circuit 3 for supplying an auxiliary power source and including a forward diode D2 and a capacitor C3 connected between the anode of the diode D2 and ground.

The output voltage from this auxiliary power source circuit 3 is supplied as an operating power source to a switching signal generator 4 and a protective circuit 5. And the output signal from the switching signal generator 4 is supplied to the gate of a field effect transistor FET1 connected between the primary winding T11 of the transformer T1 and ground, so that the field effect transistor FET1 turns on and off alternately.

A starting resistor Rs is inserted between the output of the primary rectifying circuit 1 and the power source terminal of the switching signal generator 4. This starting resistor Rs forms a supplying path of an initial power source for driving the switching signal generator 4 on the initial operation.

A voltage divider 8 comprising resistors R1, R2 connected in series is inserted between the output terminal of the secondary rectifying circuit 2 and ground. The voltage applied between the resistor R2 of the voltage divider 8 and ground is supplied to a voltage fluctuation sensing section 6, and this voltage fluctuation sensing section 6 drives the light emitting portion of an optocoupler PC1 connected to the output side, according to the input signal from the voltage divider 8.

Furthermore, the output of the light receiving portion of the optocoupler PC1 is connected to the switching signal generator 4 so that the switching signal generator 4 can control the field effect transistor FET1 according to the operating state of the optocoupler PC1, and is also connected to the protective circuit.

The operation of the SMPS having the above-mentioned construction is explained below in detail.

The alternating voltage applied to the plug PL1 is rectified in the primary rectifying circuit 1 to output the direct current DC voltage.

DC current output from the primary rectifying circuit 1 supplies the switching signal generator with an initial power source through the starting resistor Rs to drive the field effect transistor FET1 and flows through the primary winding T11 of the transformer T1 to induce a voltage to the secondary winding T12 of the load side and to the secondary winding T13 of the auxiliary side. AC voltage induced in the secondary winding T13 of the auxiliary side is rectified to DC voltage through the auxiliary power circuit 3, which is applied to the power source terminal of the switching signal generator 4 and the protective circuit 5, and accordingly the switching signal generator 4 normally works to output pulse signal to the field effect transistor FET1.

Therefore, the field effect transistor FET1 turns on and off alternately according to the pulse signals which are output from the switching signal generator, and these reiterations of on-off operation of the field effect transistor FET1 make the output voltage of the primary rectifying circuit 1 applied to the primary winding T11 of the transformer reiterate on and off.

The voltage is intermittently induced in the secondary winding T12 of the load side and to the secondary winding T13 of the auxiliary side by said reiterations, and the voltage induced in the secondary winding T12 of the load side is rectified through the secondary rectifying circuit 2, thereby supplied to the operating power source of the load side.

In such a state, since the voltage applied between the resistances R12 of the voltage divider 8 and ground is input to the voltage fluctuation sensing section 6, the voltage fluctuation sensing section 6 changes the brightness of the light emitting portion of the optocoupler PC1 in accordance with the level variation of the operating power supplied from the secondary rectifying circuit 2 to the load side. The light receiving portion detects the brightness of the light emitting portion, which is received by the switching signal generator 4 and the protective circuit 5.

In consequence, the switching signal generator 4 controls the operating cycle of the field effect transistor FET1 according to the level variation of the operating power supplied to the load side, thereby preserving the operating power supplied to the load side at a certain level. If the level-variation of the operating power is too large to be controlled, the protective circuit 5 works to stop the operation of the switching signal generator 4 so that the operating power for the load may not be at an excessive level, thereby protecting the machine connected to the load side from damage.

In such an SMPS of a current mode type, when the power turns on again after a momentary turn-off resulting from a sudden power stoppage or when the user cuts off the power as the operation of the protective circuit 5 on account of an abnormal operation of the load side causes a stop of the switching operation of the switching signal generator 4, a residual electric charge will remain in the capacitor C3 of the auxiliary power circuit 3.

In consequence, the SMPS does not work until the residual electric charge is discharged to a voltage less than a certain level, since the protective circuit 5 continues to operate even after turning on again the power switch. Accordingly, there exists a disadvantage that it takes about 5 to 7 seconds to discharge the residual electric charge of the capacitor C3 and to reoperate the SMPS.

SUMMARY OF THE INVENTION

An object of the present invention is to provide an SMPS having a discharge circuit of an auxiliary power source for bringing an end of the operation of the protective circuit by discharging the residual electric charge in the minimum time, thereby allowing rapid recommencement of a machine connected to the SMPS.

According to the present invention there is provided a switched mode power supply comprising:

a primary rectifying circuit connected to an alternating current power source for rectifying an alternating voltage into a direct current voltage;

a switching transformer connected to an output terminal of the primary rectifying circuit;

a secondary rectifying circuit connected to the switching transformer for rectifying a switching output from the switching transformer into a direct current voltage;

a voltage divider inserted between an output terminal of the secondary rectifying circuit and ground;

a voltage fluctuation sensing section for receiving an input voltage from the voltage divider and sensing the fluctuation of the DC output voltage;

a switching signal generator for generating switching signals according to an output of the voltage fluctuation sensing section;

a protective circuit for detecting whether the DC output voltage supplied to the load is normal or abnormal according to the output of the voltage fluctuation sensing section, and stopping the operation of the switching signal generator when the voltage is abnormal;

an auxiliary power source circuit connected to the switching transformer, for rectifying a voltage induced from the transformer and supplying an operating voltage to the switching signal generator and the protective circuit;

a switching transistor inserted between the switching transformer and ground, for executing switching operations repeatedly according to switching signals of the switching signal generator;

an AC power cut-off detecting circuit connected to one input terminal of the AC power source for detecting whether the AC power is on or off; and a discharge circuit for forming a discharge path for the residual electric charge held by the auxiliary power source circuit according to AC power cut-off signals from said AC power cut-off detecting circuit.

BRIEF DESCRIPTION OF THE DRAWINGS

Other objects and features of the present invention will be described below with reference to the accompanying drawings, in which.

DESCRIPTION OF THE PREFERRED EMBODIMENTS

A preferred embodiment of an SMPS according to the present invention will now be explained.

Figure 2:
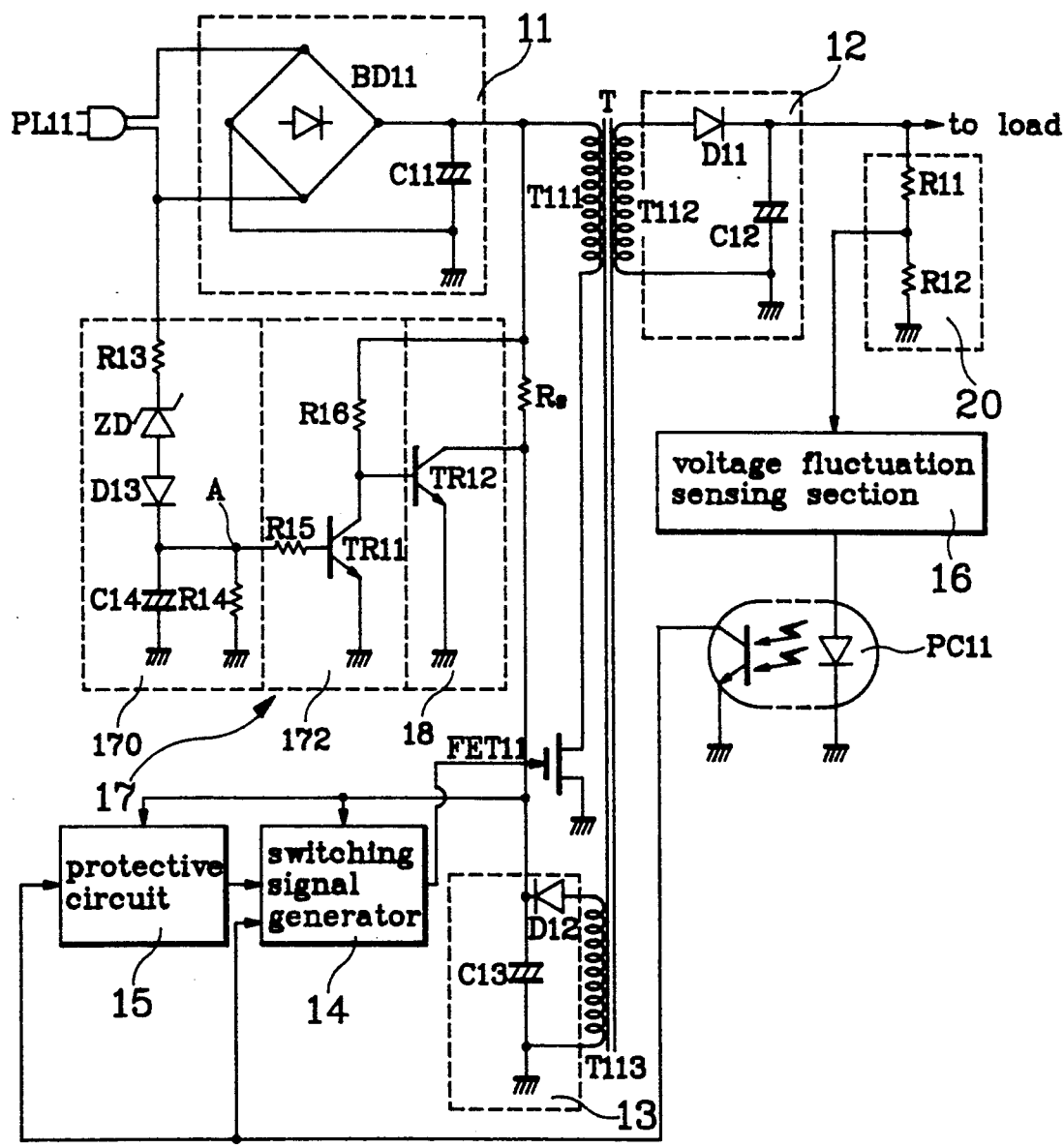
FIG. 2 is a circuit diagram of an embodiment of the SMPS according to the present invention.

FIG. 2 is a circuit diagram showing a construction of an embodiment of an SMPS of the current mode type according to the present invention. The SMPS illustrated in FIG. 2 has a construction generally similar to the prior art SMPS, but it is different in which there are added (a) an AC power cut-off detecting circuit (indicated by reference number 17) and (b) a discharge circuit (indicated by reference number 18).

Figure 1:
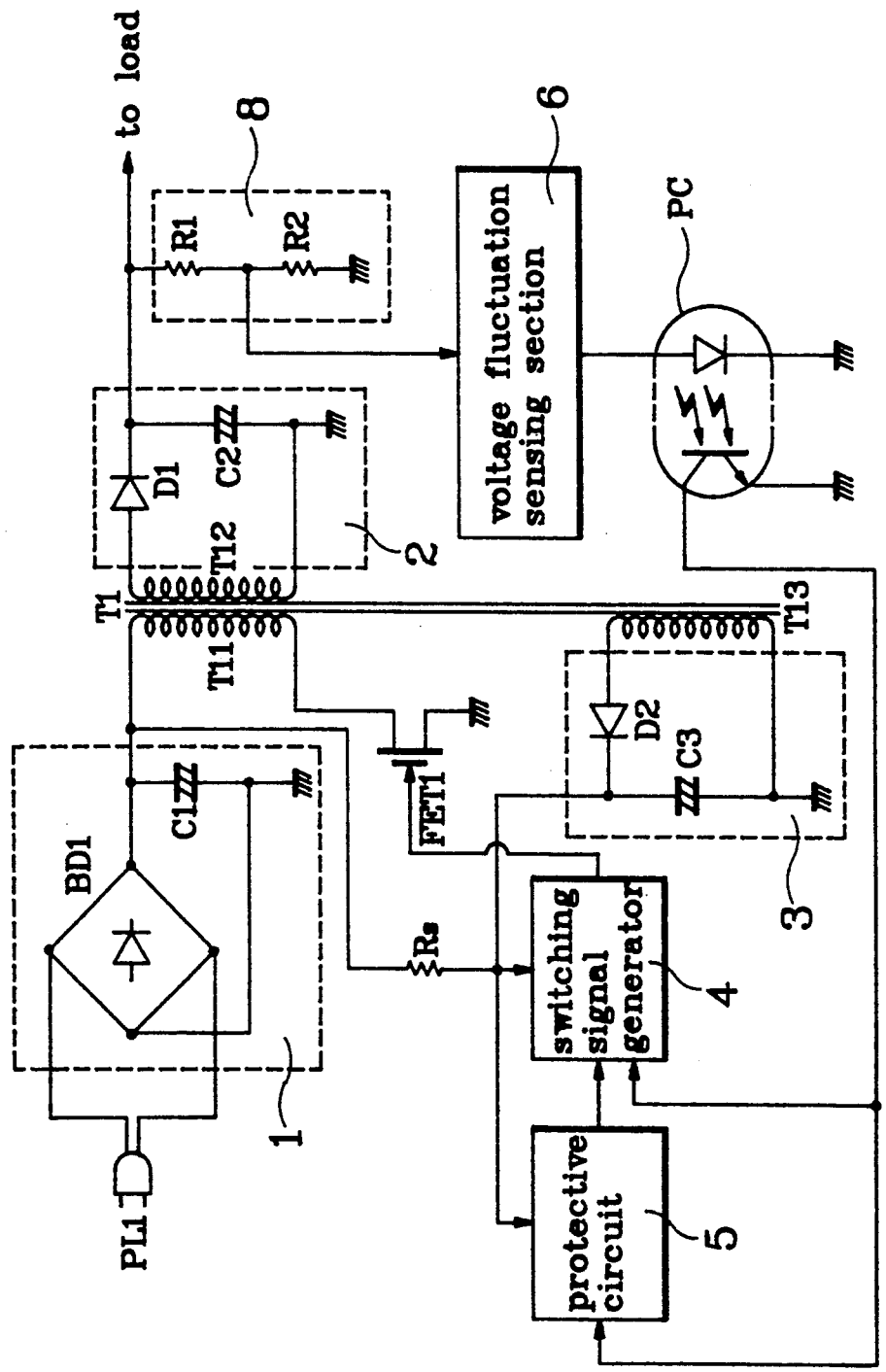
FIG. 1 is a circuit diagram illustrating an example of a prior art SMPS.

General construction of the circuit except for the AC power cut-off detecting circuit 17 and the discharge circuit 18 is the same as that in FIG. 1, so its detailed explanation will be omitted.

The AC power cut-off detecting circuit 17 according to the present invention comprises an AC power cut-off monitor 170 for monitoring whether the AC power applied to the AC input terminal is on or off and an inversion circuit 172 for inverting the output of the AC power cut-off monitor 170.

The AC power cut-off monitor 170 includes a resistor R13, a zener diode ZD, a forward-connected diode D13, and a parallel circuit of a capacitor C14 and a resistor R14 connected in serial between a terminal of the plug PL11 receiving AC power and ground, AC power cut-off monitoring signals being output from the connecting point A of the diode D13 and the resistor R14.

The inversion circuit 172 comprises a common emitter NPN type transistor TR11, a resistor for limiting base current R15 inserted between the base of the transistor TR11 and the connecting point A, and a resistor R16 inserted between collector of the transistor TR11 and the output terminal of the primary rectifying circuit 11.

This inversion circuit 172 receives the output of the AC power cut-off monitor 170 through the base resistor R15 and inverts the output of the AC power cut-off monitor 170 from the connecting point of the collector and the resistor R16.

Therefore, the AC power cut-off detecting circuit 17 produces the high-level output when the AC power is off, but when the AC power is normal, it produces the low-level output, namely the detecting signal is not output.

In addition, the discharge circuit 18 is comprised of a common emitter NPN type transistor TR12, its base being connected to the output terminal of the inversion circuit 172, its collector is connected to the output terminal of the auxiliary power circuit 13, and the emitter is grounded.

Accordingly, when the AC power cut-off detecting signal of the AC power cut-off detecting circuit 17 is supplied to the discharge circuit 18, the transistor TR12 is turned on to form a discharge path for discharging the residual electric charge held by the capacitor C13 of the auxiliary power circuit 13.

Now, the whole operation of the SMPS adopting the construction for dropping the output voltage of the auxiliary power circuit 13 according to the present invention will be explained hereafter.

AC voltage applied to the plug PL11 is rectified into the DC voltage in the primary rectifying circuit 11. This DC voltage is applied to the primary winding T111 of the switching transformer T grounded through the switching field effect transistor FET11. The switching signal generator 14 is already in the turn-on state by the applied initial power source through the starting resistor Rs, and the switching field effect transistor FET11 reiterate the state of on and off according to the control signal of the switching signal generator 14 supplied for the gate. Therefore, the rectangular wave output is transmitted to the secondary winding T112 of the load side and the secondary winding T113 of the auxiliary side, whereby the voltage is induced. The induced voltage in the secondary winding T113 of the auxiliary side is again rectified by the auxiliary power circuit 13 to be supplied to the switching signal generator 14 and the protective circuit 15 as the DC operating power, while the induced voltage in the secondary winding T112 of the load side is also again rectified by the secondary rectifier 12 to be supplied to the load side as the DC operating power.

In addition, the DC operating voltage supplied to the load, after the voltage fluctuation sensing section 16 detects the ripples, supplies the output in proportion to the ripples for the switching signal generator 14 and the protective circuit 15 through the optocoupler PC11. The switching signal generator 14 controls the operation of the switching field effect transistor FET11 according to the ripples of the output voltage, to make the DC operating voltage applied regularly to the load, while the protective circuit 15 makes the operation of the switching signal generator 14 stop in the case where DC operating power supplied to the load is abnormal. In the operating process as described above, in the case where the DC operating power for the load is normal, the AC voltage applied from a terminal of the plug PL11 through the resistor R13 to the AC voltage cut-off monitor 170 is controlled through the resistor R13 and the zener diode ZD in a constant level, and is rectified and smoothed through the diode D13 and the capacitor C14.

A constant voltage output is obtained from the connecting point A of the diode D13 and the resistor R14. This output is applied to the base of the transistor TR11 through the resistor R15 of the inversion circuit 172, thereby turning on the transistor TR11. Accordingly, the base of the transistor TR12 in the discharge circuit 18 is at a low potential and this transistor TR12 is turned off. Thus no discharge path for discharging the electric charge held in the capacitor C13 of the auxiliary power circuit 13 is provided. Therefore, the output voltage of the auxiliary power circuit 13 will continue to be supplied to the switching signal generator 14 and the protective circuit 15, so that the SMPS will continue to operate normally.

However in the process of such a normal operation, should there be a mometary power cut-off or should an abnormal state in the load occurs, the protective circuit 15 operates at once to stop the operation of the switching signal generator 14 as explained above. Accordingly, the switching field effect transistor FET11 is turned off, and no voltage is induced in the secondary winding T112 of the switching transformer T. In the consequence, supply of the DC power to the load connected to the output of the secondary rectifying circuit 12 is stopped.

When the user interrupts the power source knowing this stoppage of the power supply, the AC power cut-off detecting circuit 170 outputs an AC power cut-off detecting signal to the discharge circuit 18. As is explained in detail, the capacitance of the capacitor C14 in the AC power cut-off monitor 170 connected to a terminal of the plug PL11 is only enough to apply a bias between the base and the emitter of the transistor, so the electric charge held in the capacitor C14 will be at once discharged through the resistor R14. Therefore, sufficient voltage to drive the transistor TR11 will not be output from the connecting point A of the diode D13 and the capacitor C14.

In the consequence, the transistor TR11 in the inversion circuit 172 is turned off. The smoothing capacitor C11 of the primary rectifying circuit 11 has a capacitance relatively greater than the capacitor C14 of the AC power cut-off monitor 170 or the smoothing capacitor C13 of the auxiliary power circuit 13 has, and its time constant for discharge is set greater than that of the capacitor C11 or C13. Thus, the transistor TR12 of the discharge circuit 18 is turned on by the electric charge held in the capacitor C11. Accordingly, the residual electric charge hald in the capacitor C13 is rapidly discharged through the transistor TR12 to ground.

As a result, the output voltage of the auxiliary power circuit 13 falls rapidly, and the power supply for the protective circuit 15 and the switching signal generator 14 is stopped, thereby ceasing the operation of the protective circuit. Therefore, the SMPS returns to the initial state.

As described above in detail when the power source of the SMPS is interrupted, the discharge transistor will be turned on by the voltage held in the capacitor in the primary rectifying circuit to discharge the residual electric charge left in the capacitor of the auxiliary power circuit, thereby preventing the opertion of the system from being delayed as in the conventional case after cut-off of the power.

What is claimed is:

1. A switched mode power supply comprising:
   a primary rectifying circuit connected to an alternating current power source for rectifying an alternating voltage into a direct current voltage;
   a switching transformer connected to an output terminal of said primary rectifying circuit;
   a secondary rectifying circuit connected to said switching transformer for rectifying a switching output from said switching transformer into a direct current voltage;
   a voltage divider inserted between an output terminal of said secondary rectifying circuit and ground;
   a voltage fluctuation sensing section for receiving an input voltage from said voltage divider and sensing the fluctuation of the DC output voltage;
   a switching signal generator for generating switching signals according to an output of said voltage fluctuation sensing section;
   a protective circuit for detecting whether the DC output voltage supplied to the load is normal or abnormal according to the output of said voltage fluctuation sensing section and stopping the operation of said switching signal generator when the DC output voltage is abnormal;

an auxiliary power source circuit connected to said switching transformer, for rectifying a voltage induced from the transformer and supplying an operating voltage to said switching signal generator and said protective circuit;

a switching transistor inserted between said switching transformer and ground, for executing switching operations repeatedly according to switching signals of said switching signal generator;

an AC power cut-off detecting circuit connected to one input terminal of said AC power source for detecting whether the AC power is on or off; and a discharge circuit for forming a discharge path of the residual electric charge held in said auxiliary power source circuit according to AC power cut-off signals from said AC power cut-off detecting circuit.

2. The switched mode power supply as claimed in claim 1, wherein said AC power cut-off detecting circuit comprises an AC power cut-off monitoring means for monitoring whether the AC power applied to said AC input terminals is on or off and an inversion circuit for inverting an output of said AC power cut-off monitoring means.

3. The switched mode power supply as claimed in claim 2, wherein said AC power cut-off monitoring means comprises a resistor, a zener diode, a forward-connected diode, and a parallel-connected circuit of a capacitor and a resistor connected between one of the AC input terminals and ground, and an output signal from AC power cut-off monitoring means is derived from the connecting point of said diode and said capacitor.

4. The switched mode power supply as claimed in claim 1, wherein said auxiliary power source circuit further comprises a smoothing capacitor and said discharge circuit comprises a common emitter transistor wherein the collector of said transistor is connected to the smoothing capacitor of said auxiliary power source circuit, the base of the transistor is connected to the output terminal of said inversion circuit, and the emitter is grounded.

* * * * *